US008677182B2

(12) United States Patent
Zou (10) Patent No.: US 8,677,182 B2
(45) Date of Patent: Mar. 18, 2014

(54) COMPUTER SYSTEM CAPABLE OF GENERATING AN INTERNAL ERROR RESET SIGNAL ACCORDING TO A CATASTROPHIC ERROR SIGNAL

(75) Inventor: Xiao-Bing Zou, Shanghai (CN)

(73) Assignee: Inventec Corporation, Taipei (TW)

( * ) Notice: Subject to any disclaimer, the term of this patent is extended or adjusted under 35 U.S.C. 154(b) by 516 days.

(21) Appl. No.: 12/978,411

(22) Filed: Dec. 24, 2010

(65) Prior Publication Data

US 2012/0131384 A1    May 24, 2012

(30) Foreign Application Priority Data

Nov. 19, 2010   (CN) .......................... 2010 1 0553927

(51) Int. Cl.
*G06F 11/00*    (2006.01)
(52) U.S. Cl.
USPC .......................................................... 714/23
(58) Field of Classification Search
USPC .............................................. 714/23, 24, 55
See application file for complete search history.

(56) References Cited

U.S. PATENT DOCUMENTS

| 5,974,576 | A |   | 10/1999 | Zhu |  |
|---|---|---|---|---|---|
| 6,061,810 | A | * | 5/2000 | Potter | 714/23 |
| 6,697,973 | B1 | * | 2/2004 | Baumeister et al. | 714/55 |
| 7,293,205 | B2 | * | 11/2007 | Tsunekazu et al. | 714/699 |
| 7,484,133 | B2 | * | 1/2009 | Dybsetter et al. | 714/55 |
| 7,966,527 | B2 | * | 6/2011 | Maimone et al. | 714/55 |
| 2006/0053349 | A1 | * | 3/2006 | Ozawa | 714/55 |
| 2006/0112304 | A1 |   | 5/2006 | Subramanian et al. |  |
| 2007/0171457 | A1 |   | 7/2007 | Murahashi et al. |  |

FOREIGN PATENT DOCUMENTS

| CN | 1595821 | A | 3/2005 |
| CN | 1680925 | A | 10/2005 |
| CN | 101371465 | A | 2/2009 |
| EP | 0404415 | B1 | 12/1990 |
| TW | 1228219 |  | 2/2005 |
| TW | 1284813 |  | 8/2007 |
| TW | 1297831 |  | 6/2008 |

* cited by examiner

*Primary Examiner* — James Kramer
*Assistant Examiner* — Elmira Mehrmanesh
(74) *Attorney, Agent, or Firm* — CKC & Partners Co., Ltd.

(57) ABSTRACT

A computer system including a first processor, an error detecting circuit and a south bridge chip is provided. The first processor outputs a first catastrophic error signal. The error detecting circuit is coupled to the first processor to receive the first catastrophic error signal. When the first catastrophic error signal changes to a first level and is maintained for a period exceeding a first predetermined time, the error detecting circuit outputs an internal error reset signal. When the first catastrophic error signal changes to a first level and passes a second predetermined time, the error detecting circuit outputs a machine error reset signal. Here, the second predetermined time is greater than the first predetermined time. The south bridge chip is coupled to the error detecting circuit and reboots the computer system according the internal error reset signal or the machine error reset signal.

15 Claims, 4 Drawing Sheets

COMPUTER SYSTEM CAPABLE OF GENERATING AN INTERNAL ERROR RESET SIGNAL ACCORDING TO A CATASTROPHIC ERROR SIGNAL

CROSS-REFERENCE TO RELATED APPLICATION

This application claims the priority benefit of China application serial no. 201010553927.X, filed on Nov. 19, 2010. The entirety of the above-mentioned patent application is hereby incorporated by reference herein and made a part of this specification.

BACKGROUND OF THE INVENTION

1. Field of the Invention

The invention relates to a computer system, and more particularly to a computer system having an error detecting circuit.

2. Description of Related Art

In the earlier version of processor, Intel Corp. uses different pins to respectively outputs a machine check error signal MCERR# and an internal error signal IERR#. The machine check error signal MCERR# represents a machine check exception occurs in a system. When a machine error check mechanism detects the system malfunctions, the machine error checking mechanism notifies a kernel of an operating system, so that the kernel can adopt a corresponding measure, for example, masking the malfunctioning element (e.g. a memory). The internal error signal IERR# represents a unrecoverable and serious error has occurred in the system hardware, and the kernel can not perform program codes such that the system is in a hang-up state. Furthermore, when the internal error signal IERR# occurs, the processor enters the shutdown state. In the new generation processor, such as Xeon processor 5500; series (Nehalem-EP), of Xeon processor 5600 series and of Westmere-EP processor produced by Intel Corp., the functions of the machine check error signal MCERR# and the internal error signal IERR# are integrated in a catastrophic error signal CATERR#. However, a conventional baseboard management controller (BMC) or a BIOS can not use the catastrophic error signal CATERR# to perform a corresponding process, and thus a circuit capable of processing the catastrophic error signal CATERR# to restore the system to normal operation is required.

SUMMARY OF THE INVENTION

The invention provides a computer system capable of generating an internal error reset signal or a machine error reset signal according to a catastrophic error signal.

The invention provides a computer system including a first processor, an error detecting circuit, and a south bridge chip. The first processor outputs a first catastrophic error signal. The error detecting circuit is coupled to the first processor to receive the first catastrophic error signal. When the first catastrophic error signal changes to a first level and is maintained for a period exceeding a first predetermined time, the error detecting circuit outputs an internal error reset signal. When the first catastrophic error signal changes to the first level and passes a second predetermined time, the error detecting circuit outputs a machine error reset signal. Herein, the second predetermined period is greater than the first predetermined period. The south bridge chip is coupled to the error detecting circuit, and reboots the computer system according the internal error reset signal or the machine error reset signal.

In an embodiment of the invention, the south bridge chip enables a system rest signal when rebooting the computer system according the internal error reset signal or the machine error reset signal.

In an embodiment of the invention, the computer system further includes a baseboard management controller. The error detecting circuit outputs the first catastrophic error reference signal to the baseboard management controller when the first catastrophic error signal changes to the first level, and the baseboard management controller records a catastrophic error event in a log file according to a first catastrophic error reference signal.

In an embodiment of the invention, the error detecting circuit includes a first internal error detecting unit and a first machine error detecting unit. The first internal error detecting unit is coupled to the first processor to receive the first catastrophic error signal. When the first catastrophic error signal changes to the first level and is maintained for a period exceeding the first predetermined time, the first internal error detects unit outputs the internal error reset signal. The first machine error detecting unit is coupled to the first processor to receive the first catastrophic error signal. When the first catastrophic error signal changes to the first level and passes the second predetermined time, the first machine error detecting unit outputs the machine error reset signal. Besides, when the first catastrophic error signal changes to the first level, the first machine error detecting unit outputs the first catastrophic error reference signal.

In an embodiment of the invention, the first internal error detecting unit includes a first inverter, a first filter, and a second inverter. An input terminal of the first inverter is coupled to the processor to receive the first catastrophic error signal. An input terminal of the first filter is coupled to an output terminal of the first inverter. When a voltage level of the input terminal of the first filter is a second level and is maintained for a period exceeding the first predetermined time, a voltage level of an output terminal of the first filter changes to the second level. An input terminal of the second inverter is coupled to the output terminal of the first filter, and an output terminal of the second inventor outputs the internal error reset signal.

In an embodiment of the invention, the first filter counts according to a first clock signal when the voltage level of the input terminal of the first filter is the second level, and changes the voltage level of the output terminal of the first filter to the second level when a count result is greater than the first predetermined time.

In an embodiment of the invention, the first machine error detecting unit includes a flip-flop, a second filter, and a third inverter. The flip-flop has a first input terminal, a second input terminal, a first output terminal, and a second output terminal. The first input terminal of the flip-flop is coupled to the first processor to receive the first catastrophic error signal. The second input terminal of the flip-flop is coupled to the system rest signal. The second output terminal of the flip-flop is coupled to the baseboard management controller to output the first catastrophic error reference signal. An input terminal of the second filter is coupled to the first output terminal of the flip-flop. When a voltage level of the input terminal of the second filter is the second level and is maintained for a period exceeding the second predetermined time, a voltage level of an output terminal of the second filter changes to the second level. An input terminal of the third inverter is coupled to the output terminal of the second filter, and an output terminal of the third inventor outputs the machine error reset signal.

In an embodiment of the invention, the second filter counts according to a second clock signal when the voltage level of the input terminal of the second filter is the second level, and changes the voltage level of the output terminal of the second filter to the second level when a count result is greater than the second predetermined time.

In an embodiment of the invention, the computer system further includes at least one second processor to output at least one second catastrophic error signal. The error detecting circuit is further coupled to the at least one second processor to receive the at least one second catastrophic error signal. When one of the first catastrophic error signal and the at least one second catastrophic error signal changes to the first level and is maintained for a period exceeding the first predetermined time, the error detecting circuit outputs the internal error reset signal. When one of the first catastrophic error signal and the at least one second catastrophic error signal changes to the first level and passes the second predetermined time, the error detecting circuit outputs the machine error reset signal.

In an embodiment of the invention, the computer system further includes a baseboard management controller. When the first catastrophic error signal changes to the first level, the error detecting circuit outputs a first catastrophic error reference signal to the baseboard management controller. When one of the at least one second catastrophic error signal changes to the first level, the error detecting circuit outputs a corresponding second catastrophic error reference signal to the baseboard management controller. The baseboard management controller records a catastrophic error event in a log file according to the first catastrophic error reference signal or the at least one second catastrophic error reference signal.

In an embodiment of the invention, the error detecting circuit includes a first internal error detecting unit, a first machine error detecting unit, at least one second internal error detecting unit, at least one second machine error detecting unit, and a logic operation unit. The first internal error detecting unit is coupled to the first processor to receive the first catastrophic error signal. When the first catastrophic error signal changes to the first level and is maintained for a period exceeding the first predetermined time, the first internal error detecting unit outputs a first internal error reference signal. The first machine error detecting unit is coupled to the first processor to receive the first catastrophic error signal. When the first catastrophic error signal changes to the first level and passes the second predetermined time, the first machine error detecting unit outputs a first machine error reference signal. Besides, when the first catastrophic error signal changes to the first level, the first machine error detecting unit outputs the first catastrophic error reference signal. The at least one second internal error detecting unit is respectively coupled to one of the at least one second processor to receive the corresponding second catastrophic error signal. When the corresponding second catastrophic error signal changes to the first level and is maintained for a period exceeding the first predetermined time, the at least one second internal error detecting unit respectively outputs a corresponding second internal error reference signal. The at least one second machine error detecting unit is respectively coupled to one of the at least one second processor to receive the corresponding second catastrophic error signal. When the corresponding second catastrophic error signal changes to the first level and passes the second predetermined time, the at least one second machine error detecting unit respectively outputs a corresponding second machine error reference signal. Besides, when the corresponding second catastrophic error signal changes to the first level, the at least one second machine error detecting unit respectively outputs the corresponding second catastrophic error reference signal. The logic operation unit is coupled to the first internal error detecting unit, the first machine error detecting unit, the at least one second internal error detecting unit, and the at least one second machine error detecting unit. The logic operation unit outputs the internal error reset signal according to the first internal error reference signal and the second internal error reference signal, or outputs the machine error reset signal according to the first machine error reference signal and the second machine error reference signal.

In an embodiment of the invention, the first internal error detecting unit and the at least one second internal error detecting unit respectively includes a first inverter, a first filter, and a second inverter. An input terminal of the first inverter is coupled to the first processor or one of the at least one second processor to receive the first catastrophic error signal or the corresponding second catastrophic error signal. An input terminal of the first filter is coupled to an output terminal of the first inverter. When a voltage level of the input terminal of the first filter is a second level and is maintained for a period exceeding the first predetermined time, a voltage level of an output terminal of the first filter changes to the second level. An input terminal of the second inverter is coupled to the output terminal of the first filter. An output terminal of the second inventor outputs the first internal error reference signal or the corresponding second internal error reference signal.

In an embodiment of the invention, the first machine error detecting unit and the at least one second machine error detecting unit respectively includes a flip-flop, a second filter, and a third inverter. The flip-flop has a first input terminal, a second input terminal, a first output terminal, and a second output terminal. The first input terminal of the flip-flop is coupled to the first processor or one of the at least one second processor to receive the first catastrophic error signal or the corresponding catastrophic error signal. The second input terminal of the flip-flop is coupled to the system rest signal. The second output terminal of the flip-flop is coupled to the baseboard management controller to output the first catastrophic error reference signal or the corresponding second catastrophic error reference signal. An input terminal of the second filter is coupled to the first output terminal of the flip-flop. When a voltage level of the input terminal of the second filter is the second level and is maintained for a period exceeding the second predetermined time, a voltage level of an output terminal of the second filter changes to the second level. An input terminal of the third inverter is coupled to the output terminal of the second filter, and an output terminal of the third inventor outputs the first machine error reference signal or the corresponding second machine error reference signal.

In an embodiment of the invention, the logic operation unit includes a first AND gate and a second AND gate. A plurality input terminals of the first AND gate respectively receives the first internal error reference signal and the second internal error reference signal, and an output terminal of the first AND gate outputs the internal error reset signal. A plurality input terminals of the second AND gate respectively receives the first machine error reference signal and the second machine error reference signal, and an output terminal of the second AND gate outputs the machine error reset signal.

In an embodiment of the invention, the south bridge chip is further coupled to the first processor and the at least one second processor. The south bridge chip enables the system reset signal to reboot the computer system when one of the first catastrophic error signal and the at least one second catastrophic error signal changes to the first level and is maintained for a period exceeding the first predetermined time.

In an embodiment, the south bridge chip is further coupled to the first processor, and enables the system reset signal to reboot the computer system when the first catastrophic error signal changes to the first level and is maintained for a period exceeding the first predetermined time.

Based on the above, the error detecting circuit of the computer system of the invention is capable of generating the internal error reset signal or the machine error reset signal according to the received first catastrophic error signal or the received second catastrophic error signal. Thus, the computer system can be rebooted immediately when the first catastrophic error signal or the second catastrophic error signal is the internal error reset signal, or be rebooted when the first catastrophic error signal or the second catastrophic error signal is the machine error reset signal and passes the second predetermined time.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
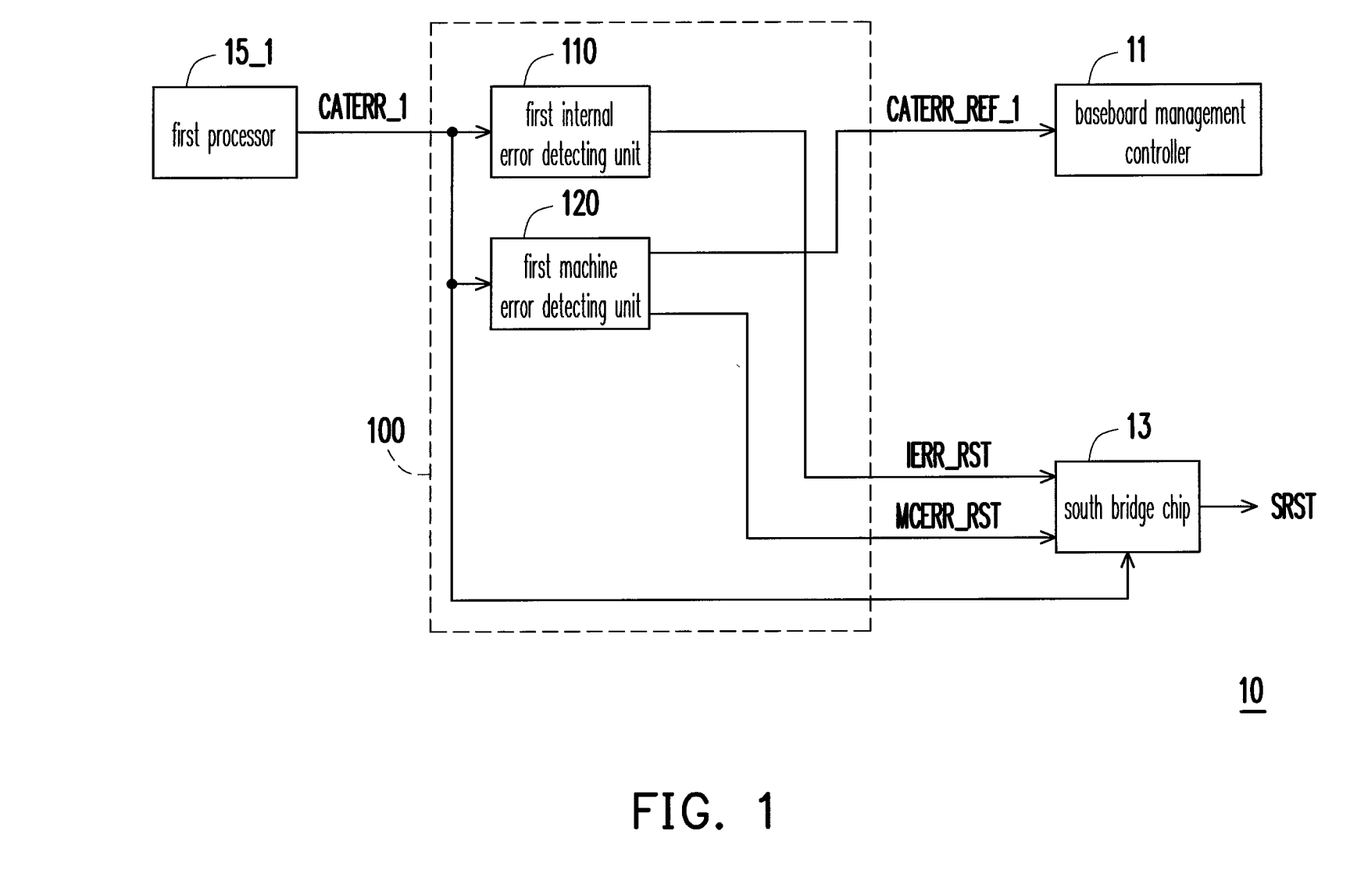
FIG. 1 is a schematic block diagram of a computer system according to an embodiment of the invention.

FIG. 1 is a schematic block diagram of a computer system according to an embodiment of the invention. Referring to FIG. 1, a computer system 10 includes a baseboard management controller 11, a south bridge chip 13, a first processor 15_1, and an error detecting circuit 100. The error detecting circuit 100 is coupled between the baseboard management controller 11, the south bridge chip 13, and the first processor 15_1 to receive a first catastrophic error signal CATERR_1 output by the first processor 15_1. The error detecting circuit 100 output a first catastrophic error reference signal CATERR_REF_1 and an internal error reset signal IERR_RST or a machine error reset signal MCERR_RST according to the first catastrophic error signal CATERR_1.

The error detecting circuit 100 outputs the first catastrophic error reference signal CATERR_REF_1 to the baseboard management controller 11 when the first catastrophic error reference signal CATERR_REF_1 changes to a low level (i.e., a first level), and the baseboard management controller 11 records a catastrophic error event in a log file according to the first catastrophic error reference signal CATERR_REF_1. The error detecting circuit 100 outputs the internal error reset signal IERR_RST to the south bridge chip 13 when the first catastrophic error reference signal CATERR_1 changes to the low level and is maintained for a period exceeding 120 nanoseconds (i.e., a first predetermined time), and outputs the machine error reset signal MCERR_RST to the south bridge chip 13 when the first catastrophic error reference signal CATERR_1 changes to the low level and passes 2 seconds (i.e., a second predetermined time).

The south bridge chip 13 reboots the computer system 10 according the internal error reset signal IERR_RST or the machine error reset signal MCERR_RST, so that the computer system 10 is warm rebooted or cold rebooted. Besides, the south bridge chip 13 is further coupled to the first processor 15_1 to receive the first catastrophic error signal CATERR_1, and the south bridge chip 13 enables a system reset signal SRST to reboot the computer system 10 when the first catastrophic error signal CATERR_1 changes to the low level and is maintained for a period exceeding 120 nanoseconds.

Furthermore, the error detecting circuit 100 includes a first internal error detecting unit 110 and a first machine error detecting unit 120. The first internal error detecting unit 110 and the first machine error detecting unit 120 are coupled to the first processor 15_1 to receive the first catastrophic error signal CATERR_1. When the first catastrophic error signal CATERR_1 changes to the low level and is maintained for a period exceeding 120 nanoseconds, the first internal error detecting unit 110 outputs the internal error reset signal IERR_RST. The first machine detecting circuit 120 outputs a first catastrophic error reference signal CATERR_REF_1 when the first catastrophic error signal CATERR_1 changes to the low level, and outputs a machine error reset signal MCERR_RST when the first catastrophic error signal CATERR_1 changes to the low level and passes 2 seconds (i.e., a second predetermined time).

Figure 2:
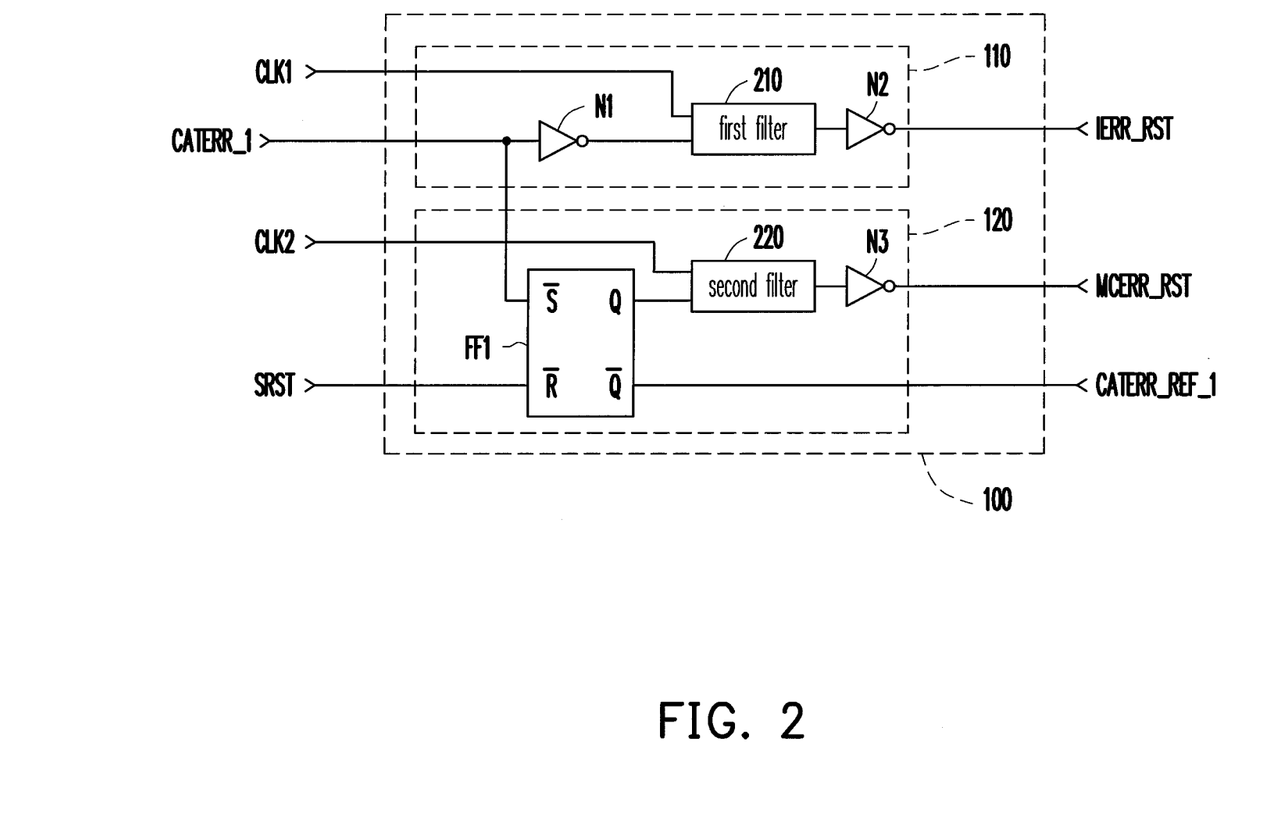
FIG. 2 is a schematic circuit diagram of a error detecting circuit of FIG. 1 according to an embodiment of the invention.

FIG. 2 is a schematic circuit diagram of a error detecting circuit of FIG. 1 according to an embodiment of the invention. Referring to FIG. 1 and FIG. 2, the first internal error detecting circuit 110 includes a first inverter N1, a first filter 210, and a second inverter N2. The first machine error detecting unit 120 includes an RS flip-flop FF1, a second filter 220, and a third inverter N3.

In the first internal error detecting unit 110, an input terminal of the first inverter N1 is coupled to the first processor 15_1 to receive the first catastrophic error signal CATERR_1, and an output terminal of the first inverter N1 is coupled to an input terminal of the first filter 210. The first filter 210 is coupled to a clock signal CLK1, and an output terminal of the first filter 210 is coupled to an input terminal of the second inverter N2. An output terminal of the second inverter N2 outputs the internal error reset signal IERR_RST.

In the first machine error detecting unit 120, a setting input terminal (i.e., a first input terminal) $\overline{S}$ of the RS flip-flop FF1 is coupled to the first processor 15_1 to receive the first catastrophic error signal CATERR_1. A reset input terminal (i.e., a second input terminal) $\overline{R}$ of the RS flip-flop FF1 receives a system rest signal SRST. A positive output terminal (i.e., a first output terminal) Q of the RS flip-flop FF1 is coupled to an input terminal of the second filter 220. A negative output terminal (i.e., a second output terminal) $\overline{Q}$ of the RS flip-flop FF1 is coupled to the baseboard management controller 11 to output the first catastrophic error reference signal CATERR_REF_1.

The second filter 220 is coupled to a clock signal CLK2, and an output terminal of the second filter 220 is coupled to an input terminal of the third inverter N3. An output terminal of the third inverter N3 outputs the machine error reset signal MCERR_RST.

The output terminal of the first inverter N1 outputs a high level (i.e., a second level) when the first catastrophic error signal CATERR_1 is set to the low level (i.e., a machine check error or an internal error occurs). At this time, a voltage level of the input terminal of the first filter 210 is the high level. When the catastrophic error signal CATERR_1 represents an internal error signal IERR#, the pulse width of the catastrophic error signal CATERR_1 is greater than 120 nanoseconds. In other words, the period in which the voltage level of the input terminal of the first filter 210 maintaining at the high level is greater than 120 nanoseconds. When the voltage level of the input terminal of the first filter 210 is the high level and is maintained for a period exceeding 120 nanoseconds (i.e., the first predetermined time), the first filter 210 changes a voltage level of the output terminal thereof to the high level.

Accordingly, the clock signal CLK1 (i.e., a first clock signal) may be set to 20 MHz, and the first filter 210 may count when the voltage level of the input terminal thereof is the high level. After three clocks (i.e., 150 nanoseconds) are counted (i.e. a count result greater than 120 nanoseconds), the first filter 210 changes the voltage level of the output terminal thereof to the high level, so that the pulse width of the negative pulse of the first catastrophic error signal CATERR_1 narrower than 150 nanoseconds (including 120 nanoseconds) can be filtered. However, in another embodiment, people skilled in the pertinent art may adjust the frequency of the clock signal CLK1 and the counted number of the clocks, as long as the pulse width of the negative pulse of the first catastrophic error signal CATERR_1 is smaller than or equal to 120 nanoseconds can be filtered.

When the voltage level of the output terminal of the first filter 210 changes to the high level, the voltage level of the output terminal of the second inverter N2 changes to the low level (i.e., the internal error reset signal IERR_RST is set to the low level) which represents an internal error occurs and the computer system 10 requires being rebooted to eliminate the internal error.

On the other hand, when the first catastrophic error signal CATERR_1 is set to the low level, since the setting input terminal $\overline{S}$ is triggered with a low level, the positive output terminal Q of the RS flip-flop FF1 outputs a high level and the negative output terminal $\overline{Q}$ of the RS flip-flop FF1 outputs a low level (i.e., the first catastrophic error reference signal CATERR_REF_1 is set to the low level) so as to notify the baseboard management controller 11 that a machine check error or an internal error occurs.

At this time, a voltage level of the input terminal of the second filter 220 is the high level. When the first catastrophic error signal CATERR_1 represents the machine error check signal MCERR#, the voltage level of the setting input terminal $\overline{S}$ of the RS flip-flop FF1 is the low level and is maintained for 120 nanoseconds and the positive output terminal Q of the RS flip-flop FF1 continuously outputs the high level after being set. When a voltage level of the input terminal of the second filter 220 is the high level and is maintained for 2 seconds (i.e., the second predetermined time), the second filter 220 changes the voltage level of the output terminal thereof to the high level.

Accordingly, the clock signal CLK2 (i.e., a second clock signal) may be set to 512 Hz, and the second filter 220 may count when the voltage level of the input terminal thereof is the high level. After 1024 clocks (i.e., 2 seconds) are counted (i.e. the count result is greater than 2 seconds), the second filter 220 changes the voltage level of the output terminal thereof to the high level to represent a machine check error occur in the computer system 10 for a period longer than 2 seconds without being handled. However, in another embodiment, people skilled in the pertinent art may adjust the frequency of the clock signal CLK2 and the counted number of the clocks, as long as the filter 220 filters for a long time.

When the voltage level of the output terminal of the second filter 220 changes to the high level, the voltage level of the output terminal of the third inverter N3 changes to the low level (i.e., the machine error reference signal MCERR_RST is set to the low level) which represents an machine internal error occurred and passes a period longer than 2 seconds, and then the computer system 10 requires being rebooted to eliminate the machine check error.

Accordingly, when the first catastrophic error signal CATERR_1 is set to the low level, the first processor 15_1 of the computer system 10 finds an internal error or a machine check error. When the first catastrophic error signal CATERR_1 is the internal checking error IERR#, the internal error reset signal IERR_RST is generated and transmitted to the south bridge chip 13 after the first catastrophic error signal CATERR_1 passes through the first inverter N1, the first filter 210, and the second filter N2, so as to control the south bridge chip 13 to reboot the computer system 10. Herein, the period between the first catastrophic error signal CATERR_1 being set to the low level and the computer system 10 being rebooted is a short period (e.g., generally several hundreds of nanoseconds). When the computer system 10 is rebooted, the system reset signal SRST is set to the low level representing the error is eliminated by rebooting the computer system 10, and the positive output terminal Q of the flip-flop FF1 changes to the low level so as to reset the second filter 220.

On the contrary, when the first catastrophic error signal CATERR_1 is set to the low level and is maintained for 120 nanoseconds, the first catastrophic error signal CATERR_1 is the machine check error signal MCERR#. At this time, the machine error reset signal MCERR_RST is generated and transmitted to the south bridge chip 13 after the first catastrophic error signal CATERR_1 passes through the RS flip-flop FF1, the second filter 220, and the third filter N3, so as to control the south bridge chip 13 to reboot the computer system 10.

However, the computer system 10 can still operate after the machine check error MCERR# is identified. Thus, before the south bridge chip 13 receives the machine error reset signal MCERR_RST, an operating system of computer system 10 still can be notified that an error occurs through a system chip (e.g. the south bridge chip 13 or the baseboard management controller 11), and the computer system 10 is rebooted after knowing that the error occurs.

Figure 3:
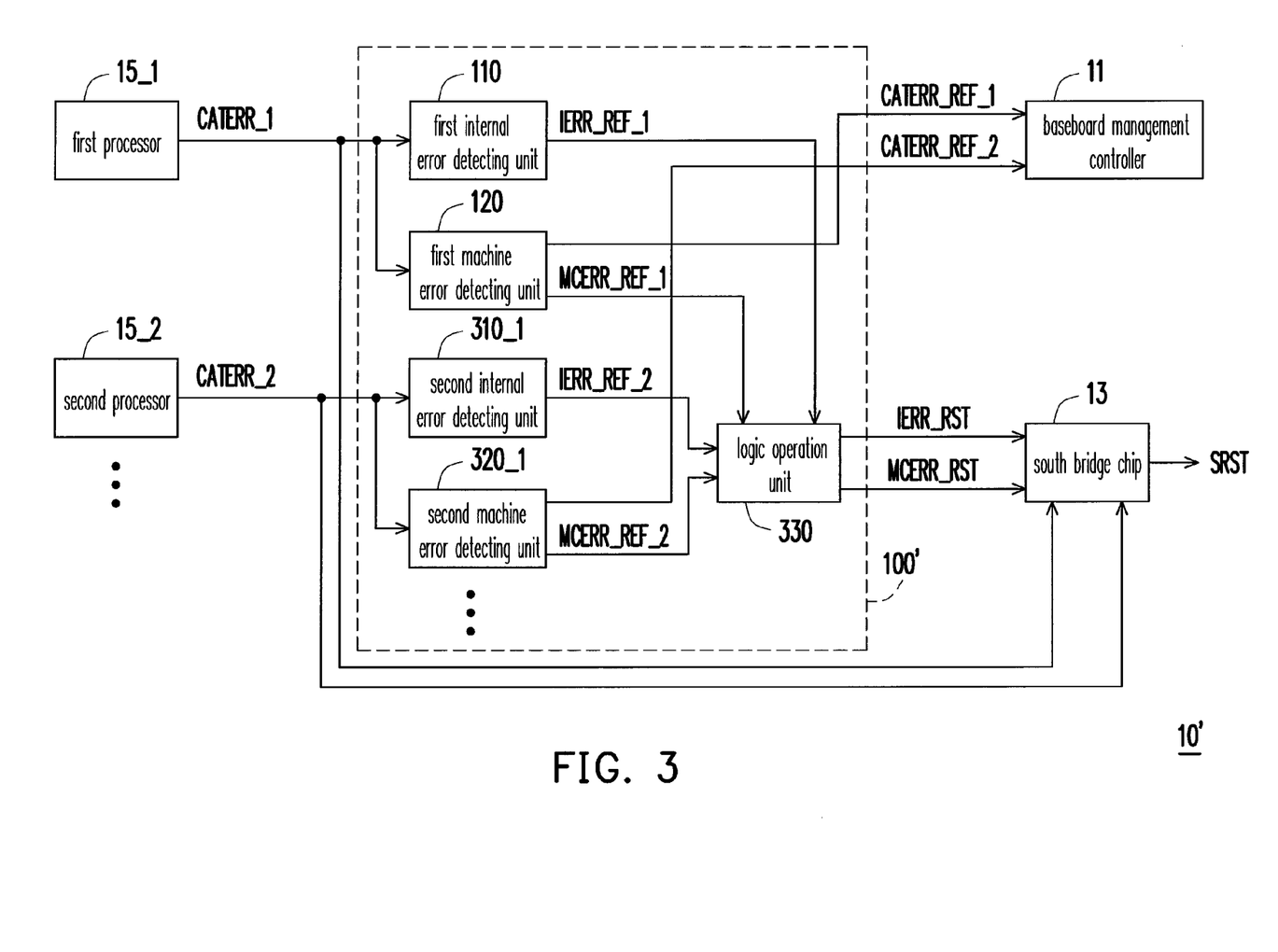
FIG. 3 is a schematic block diagram of a computer system according to another embodiment of the invention.

FIG. 3 is a schematic block diagram of a computer system according to another embodiment of the invention. Referring to both FIGS. 1 and 3, in the embodiment, the computer system 10' further includes at least one second processor (e.g. 15_2). Each of the second processors (e.g. 15_2) outputs a corresponding second catastrophic error signal (e.g. CATERR_2). An error detecting circuit 100' is further coupled to the second processor (e.g. 15_2) to receive the second catastrophic error signal (e.g. CATERR_2) output by the second processor (e.g. 15_2), and outputs a corresponding second catastrophic error reference signal (e.g. CATERR_REF_2) and the internal error reset signal IERR_RST or the machine error reset signal MCERR_RST according to the second catastrophic error signal (e.g. CATERR_2).

In the embodiment, the error detecting circuit 100' outputs the first catastrophic error reference signal CATERR_REF_1 to the baseboard management controller 11 when the first catastrophic error signal CATERR_1 changes to the low level. The error detecting circuit 100' outputs the corresponding second catastrophic error reference signal (e.g. CATERR_REF_2) to the baseboard management controller 11 when one of the second catastrophic error signals (e.g. CATERR_2) changes to the low level. The baseboard management controller 11 records a catastrophic error event in a log file according to the first catastrophic error reference signal CATERR_REF_1 and the second catastrophic error reference signal (e.g. CATERR_REF_2).

The error detecting circuit 100' outputs the internal error reset signal IERR_RST to the south bridge chip 13 when one of the first catastrophic error signal CATERR_1 and the at least one second catastrophic error signal (e.g. CATERR_2) changes to the low level and is maintained for a period exceeding 120 nanoseconds, and outputs the machine error reset signal MCERR_RST to the south bridge chip 13 when one of the first catastrophic error signal CATERR_1 and the second catastrophic error signal (e.g. CATERR_2) changes to the low level and passes 2 seconds.

Besides, the south bridge chip 13 is further coupled to the second processor (e.g. 15_2) to receive the second catastrophic error signal (e.g. CATERR_2), and the south bridge chip 13 enables a system reset signal SRST to reboot the computer system 10 when one of the first catastrophic error signal CATERR_1 and the second catastrophic error signal (e.g. CATERR_2) changes to the low level and is maintained for a period exceeding 120 nanoseconds.

Furthermore, the error detecting circuit 100' further includes at least one second internal error detecting unit (e.g. 310_1), at least one second machine error detecting unit (e.g. 320_1), and a logic operation unit 330. The operation of the first internal error detecting unit 110 and the operation of the first machine error detecting unit 120 are similar to those described in the above embodiment of the invention, while the first internal error detecting unit 110 and the first machine error detecting unit 120 herein respectively outputs the first internal error reference signal IERR_REF_1 and the first machine error reference signal MCERR_REF_1.

The second internal error detecting unit (e.g. 310_1) and the second machine error detecting unit (e.g. 320_2) are respectively coupled to the corresponding second processor (e.g. 15_2) to receive the corresponding second catastrophic error signal (e.g. CATERR_2). Each of the second internal error detecting units (e.g. 310_1) respectively outputs a corresponding second internal error reference signal (e.g. IERR_REF_2) when the corresponding second catastrophic error signal (e.g. CATERR_2) changes to the low level and is maintained for a period exceeding 120 nanoseconds. Each of the second machine detecting circuits (e.g. 320_1) outputs the corresponding second catastrophic error reference signal (e.g. CATERR_REF_2) when the corresponding second catastrophic error signal (e.g. CATERR_2) changes to the low level, and outputs a corresponding second machine error reference signal (e.g. MCERR_REF_2) when the corresponding second catastrophic error signal (e.g. CATERR_2) changes to the low level and passes 2 seconds.

The logic operation unit 330 is coupled to the first internal error detecting unit 110 and the second internal error detecting unit (e.g. 310_1) so as to receive the first internal error reference signal IERR_REF_1 and the second internal error reference signal (e.g. IERR_REF_2), and coupled to the first machine error detecting unit 120 and the second machine error detecting unit (e.g. 320_1) so as to receive the first machine error reference signal MCERR_REF_1 and the second machine error reference signal (e.g. MCERR_REF_2). When the logic operation unit 330 receives one of the first internal error reference signal IERR_REF_1 and the second internal error reference signal (e.g. IERR_REF_2), the logic operation unit 330 outputs the internal error reset signal IERR_RST to the south bridge chip 13 according to the received internal error reference signal. When the logic operation unit 330 receives one of the first machine error reference signal MCERR_REF_1 and the second machine error reference signal (e.g. MCERR_REF_2), the logic operation unit 330 outputs the machine error reset signal MCERR_RST to the south bridge chip 13 according to the received machine error reference signal.

Figure 4:
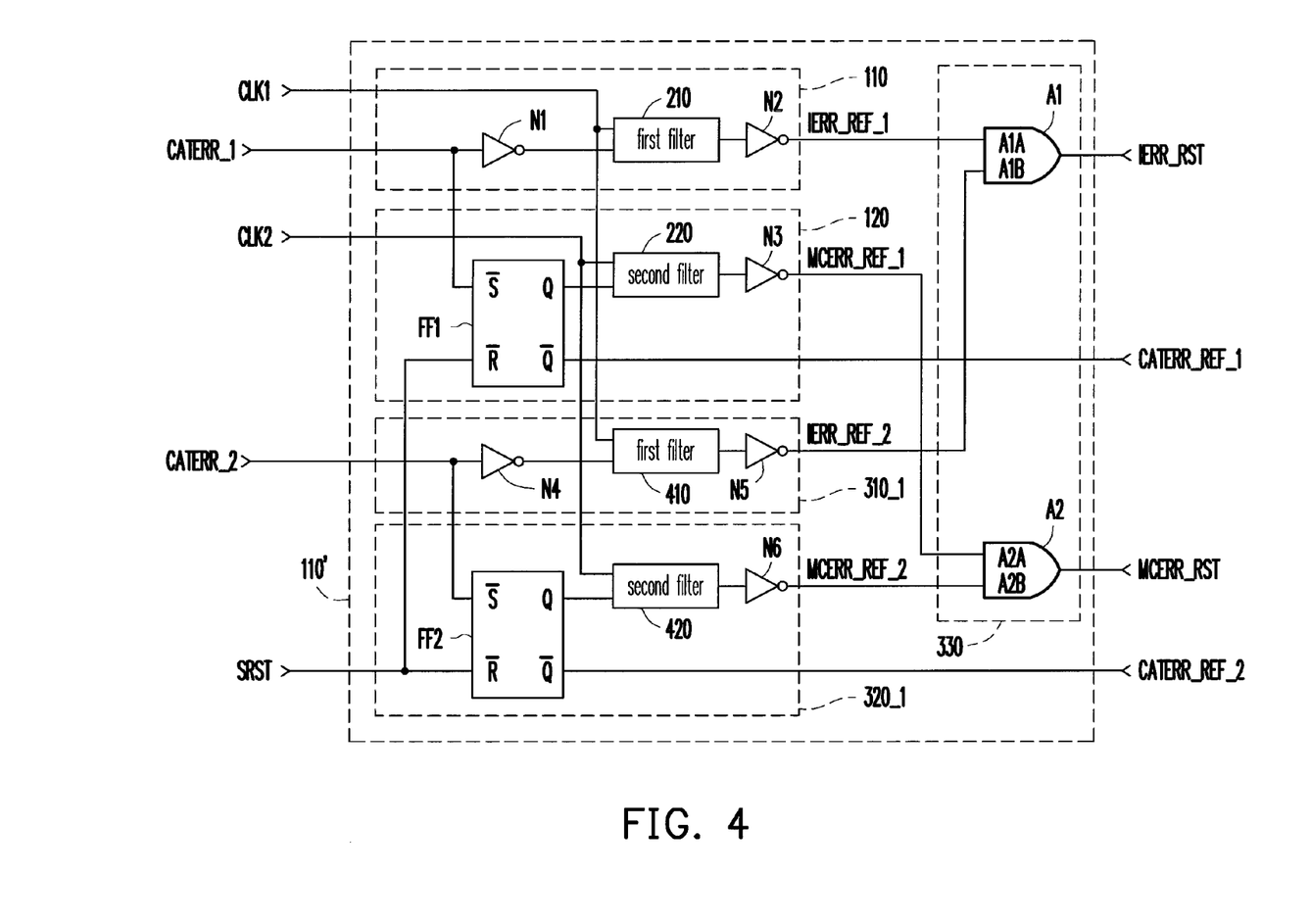
FIG. 4 is a schematic circuit diagram of a error detecting circuit of FIG. 3 according to an embodiment of the invention.

FIG. 4 is a schematic circuit diagram of a error detecting circuit of FIG. 3 according to an embodiment of the invention. Referring to FIGS. 2 to 4, in the embodiment, the error detecting circuit 100' includes the first internal error detecting unit 110, the first machine error detecting unit 120, one second internal error detecting unit 310_1, one second machine error detecting unit 320_1, and the logic operation unit 330. Herein, the circuit structures of the first internal error detecting unit 110 and the first machine error detecting unit 120 are similar to those described in the above embodiment of the invention, while the second inverter N2 of the embodiment outputs the first internal error reference signal IERR_REF_1, and the third inverter N3 of the embodiment outputs the first machine error reference signal MCERR_REF_1. The second internal error detecting unit 310_1 includes a first inverter N4, a first filter 410, and a second inverter N5. The second machine error detecting unit 320_1 includes an RS flip-flop FF2, a second filter 420, and a third inverter N6. The logic operation unit 330 includes a first AND gate A1 and a second AND gate A2.

The operation of the second internal error detecting unit 310_1 is similar to the first internal error detecting unit 110. In other words, the first inverter N4 is similar to the first inverter N1, the first filter 410 is similar to the first filter 210, and the second inverter N5 is similar to the second inverter N2. The operation of the second machine error detecting unit 320_1 is similar to the first machine error detecting unit 120. In other words, the RS flip-flop FF2 is similar to the RS flip-flop FF1, the second filter 420 is similar to the second filter 220, and the third inverter N6 is similar to the third inverter N3. Herein, an input terminal of the first inverter N4 and asetting input terminal $\overline{S}$ of the RS flip-flop FF2 receive the second catastrophic error signal CATERR_2, an output terminal of the second inverter N5 outputs the second internal error reference signal IERR_REF_2, and the third inverter N6 outputs the second machine error reference signal MCERR_REF_2.

A first input terminal A1A of the first AND gate A1 is coupled to an output terminal of the second inverter N2 to receive the first internal error reference signal IERR_REF_1. A second input terminal A1B of the first AND gate A1 is coupled to an output terminal of the second inverter N5 to receive the second internal error reference signal IERR_REF_2. An output terminal of the first AND gate A1 outputs the internal error reset signal IERR_RST. A second input terminal A2A of the second AND gate A2 is coupled to an output terminal of the third inverter N3 to receive the first machine error reference signal MCERR_REF_1. A second input terminal A2B of the second AND gate A2 is coupled to an output terminal of the third inverter N6 to receive the second machine error reference signal MCERR_REF_2. An output terminal of the second AND gate A2 outputs the machine error reset signal MCERR_RST.

In summary, the computer system according to the embodiments of the invention can output the internal error reset signal when one of the first catastrophic error signal and the second catastrophic error signal forms a negative pulse with a pulse width wider than 120 nanoseconds, and output the machine error reset signal when one of the first catastrophic error signal and the second catastrophic error signal forms a negative pulse with a pulse width equal to 120 nanoseconds and passes 2 seconds. Therefore, by using the error detecting circuit, an error message of the catastrophic error signal can be distinguished and a corresponding reset signal can be provided after a corresponding period.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A computer system, comprising:
a first processor, outputting a first catastrophic error signal;
an error detecting circuit, coupled to the first processor to receive the first catastrophic error signal, wherein the error detecting circuit further comprises a first internal error detecting unit and a first machine error detecting unit, the first internal error detecting unit outputting an internal error reset signal when the first catastrophic error signal changes to a first level and is maintained for a period exceeding a first predetermined time, and the first machine error detecting unit outputting a machine error reset signal when the first catastrophic error signal changes to the first level and passes a second predetermined time, wherein the second predetermined time is greater than the first predetermined time; and
a south bridge chip, coupled to the error detecting circuit, and rebooting the computer system according the internal error reset signal or the machine error reset signal, wherein the first internal error detecting unit comprises:
a first inverter, wherein an input terminal of the firs inverter is coupled to the first processor to receive the first catastrophic error signal;
a first filter, wherein an input terminal of the first filter coupled to an output terminal of the first inverter, and when a voltage level of the input terminal of the first filter is a second level and is maintained for a period exceeding the first predetermined time, a voltage level of an output terminal of the firs filter changes to the second level;
a second inverter, wherein an input terminal of the second inverter is coupled to the output terminal of the first filter, and an output terminal of the second inventor outputs the internal error reset signal.

2. The computer system as claimed in claim 1, wherein the south bridge chip enables a system reset signal when rebooting the computer system according the internal error reset signal or the machine error reset signal.

3. The computer system as claimed in claim 2, further comprising a baseboard management controller, the error detecting circuit outputting a first catastrophic error reference signal to the baseboard management controller when the first catastrophic error signal changes to the first level, and the management controller recording a catastrophic error event in a log file according to the first catastrophic error reference signal.

4. The computer system as claimed in claim 3, wherein the first machine error detecting unit outputting the first catastrophic error reference signal when the first catastrophic error signal changes to the first level.

5. The computer system as claimed in claim 2, further comprising at least one second processor to output at least one second catastrophic error signal, the error detecting circuit further coupled to the at least one second processor to receive the at least one second catastrophic error signal, the error detecting circuit outputting the internal error reset signal when one of the first catastrophic error signal and the at least one second catastrophic error signal changes to the first level and is maintained for a period exceeding the first predetermined time, and outputting the machine error reset signal when one of the first catastrophic error signal and the at least one second catastrophic error signal changes to the first level and passing the second predetermined time.

6. The computer system as claimed in claim 5, further comprising a baseboard management controller, the error detecting circuit outputting a first catastrophic error reference signal to the baseboard management controller when the first catastrophic error signal changes to the first level, and outputting a corresponding second catastrophic error reference signal to the baseboard management controller when the one of the at least one second catastrophic error signal changes to the first level, and the baseboard management controller recording a catastrophic error event in a log file according to the first catastrophic error reference signal or the at least one second catastrophic error reference signal.

7. The computer system as claimed in claim 5, wherein the south bridge chip is further coupled to the first processor and the at least one second processor, and enables the system reset signal to reboot the computer system when one of the first catastrophic error signal and the at least one second catastrophic error signal changes to the first level and is maintained for a period exceeding the first predetermined time.

8. The computer system as claimed in claim 2, wherein the south bridge chip is further coupled to the first processor, and enables the system reset signal to reboot the computer system when the first catastrophic error signal changes to the first level and is maintained for a period exceeding the first predetermined time.

9. The computer system as claimed in claim 1, wherein the first filter counts according to a first clock signal when the voltage level of the input terminal of the first filter is the second level, and changes the voltage level of the output terminal of the first filter to the second level when a count result is greater than the first predetermined time.

10. The computer system as claimed in claim 1, wherein the first machine error detecting unit comprises:
a flip-flop, having a first input terminal, a second input terminal, a fi output terminal, and a second output terminal, the first input terminal of the flip-flop coupled to the first processor to receive the first catastrophic error signal, the second input terminal of the flip-flop coupled to the system rest signal, the second output terminal of the flip-flop coupled to the baseboard management controller to output the first catastrophic error reference signal;
a second filter, wherein an input terminal of the second filter is coupled to the first output terminal of the flip-flop, and when a voltage level of the input terminal of the second filter is the second level and is maintained for a period exceeding the second predetermined time, a voltage level of an output terminal of the second filter changes to the second level; and
a third inverter, wherein an input terminal of the third inverter is coupled to the output terminal of the second filter, and an output terminal of the third inventor outputs the machine error reset signal.

11. The computer system as claimed in claim 10, wherein the second filter counts according to a second clock signal when the voltage level of the input terminal of the second filter is the second level, and changes the voltage level of the output terminal of the second filter to the second level when a count result is greater than the second predetermined time.

12. A computer system, comprising:
a first processor, outputting a first catastrophic error signal;
at least one second processor to output at least one second catastrophic error signal;

a first internal error detecting unit, coupled to the first processor to receive the first catastrophic error signal, the first internal error detecting unit outputting a first internal error reference signal when the first catastrophic error signal changes to a first level and is maintained for a period exceeding a first predetermined time;

a first machine error detecting unit, coupled to the first processor to receive the first catastrophic error signal, the first machine error detecting unit outputting a first machine error reference signal when the first catastrophic error signal changes to the first level and passes a second predetermined time, and outputting the first catastrophic error reference signal when the first catastrophic error signal changes to the first level;

at least one second internal error detecting unit, respectively coupled to one of the at least one second processor to receive the corresponding second catastrophic error signal, the at least one second internal error detecting unit respectively outputting a corresponding second internal error reference signal when the corresponding second catastrophic error signal changes to the first level and is maintained for a period exceeding the first predetermined time;

at least one second machine error detecting unit, respectively coupled to one of the at least one second processor to receive the corresponding second catastrophic error signal, respectively outputting a corresponding second machine error reference signal when the corresponding second catastrophic error signal changes to the first level and passes the second predetermined time, and respectively outputting the corresponding second catastrophic error reference signal when the corresponding second catastrophic error signal changes to the first level;

a logic operation unit, coupled to the first internal error detecting unit, the first machine error detecting unit, the at least one second internal error detecting unit, and the at least one second machine error detecting unit, wherein the logic operation unit outputs an internal error reset signal according to the first internal error reference signal and the at least one second internal error reference signal, or outputs a machine error reset signal according to the first machine error reference signal and the at least one second machine error reference signal;

a south bridge chip, coupled to the logic operation unit, and rebooting the computer system according the internal error reset signal or the machine error reset signal.

13. The computer system as claimed in claim 12, wherein the first internal error detecting unit and the at least one second internal error detecting unit respectively comprises:

a first inverter, wherein an input terminal of the first inverter is coupled to the first processor or the at least one second processor to receive the first catastrophic error signal or the corresponding second catastrophic error signal;

a first filter, wherein an input terminal of the first filter is coupled to an output terminal of the first inverter, and when a voltage level of the input terminal of the first filter is a second level and is maintained for a period exceeding the first predetermined time, a voltage level of an output terminal of the first filter changes to the second level; and a second inverter, wherein an input terminal of the second inverter is coupled to the output terminal of the first filter, and an output terminal of the second inventor outputs the first internal error reference signal or the corresponding second internal error reference signal.

14. The computer system as claimed in claim 13, wherein the first machine error detecting unit and the at least one second machine error detecting unit respectively comprises:

a flip-flop, having a first input terminal, a second input terminal, a first output terminal, and a second output terminal, the first input terminal of the flip-flop coupled to the first processor or one of the at least one second processors to receive the first catastrophic error signal or the corresponding catastrophic error signal, the second input terminal of the flip-flop coupled to the system rest signal, the second output terminal of the flip-flop coupled to the baseboard management controller to output the first catastrophic error reference signal or the corresponding second catastrophic error reference signal;

a second filter, wherein an input terminal of the second filter is coupled to the first output terminal of the flip-flop, and when a voltage level of the input terminal of the second filter is the second level and is maintained for a period exceeding the second predetermined time, a voltage level of an output terminal of the second filter changes to the second level; and a third inverter, wherein an input terminal of the third inverter is coupled to the output terminal of the second filter, and an output terminal of the third inventor outputs the first machine error reference signal or the corresponding second machine error reference signal.

15. The computer system as claimed in claim 12, wherein the logic operation unit comprises:

a first AND gate, wherein a plurality input terminals of the first AND gate respectively receives the first internal error reference signal and the at least one second internal error reference signal, and an output terminal of the first AND gate outputs the internal error reset signal; and a second AND gate, wherein a plurality input terminals of the second AND gate respectively receives the first machine error reference signal and the at least one second machine error reference signal, and an output terminal of the second AND gate outputs the machine error reset signal.

* * * * *